(12) United States Patent
Gonzalez Moreno

(10) Patent No.: US 9,531,320 B2
(45) Date of Patent: Dec. 27, 2016

(54) GUIDE SYSTEM FOR SOLAR PANELS

(71) Applicant: Soitec Solar GMBH, Freiburg (DE)

(72) Inventor: Abel Gonzalez Moreno, Tudela (ES)

(73) Assignee: Soitec Solar GMBH, Freiburg (DE)

(\*) Notice: Subject to any disclaimer, the term of this patent is extended or adjusted under 35 U.S.C. 154(b) by 0 days.

(21) Appl. No.: 14/441,676

(22) PCT Filed: Nov. 5, 2013

(86) PCT No.: PCT/EP2013/073030
§ 371 (c)(1),
(2) Date: May 8, 2015

(87) PCT Pub. No.: WO2014/072280
PCT Pub. Date: May 15, 2014

(65) Prior Publication Data
US 2015/0303864 A1  Oct. 22, 2015

(30) Foreign Application Priority Data
Nov. 12, 2012  (FR) .................... 12 60755

(51) Int. Cl.
*H02N 6/00* (2006.01)
*H01L 31/042* (2014.01)
(Continued)

(52) U.S. Cl.
CPC ............ *H02S 20/32* (2014.12); *F16M 11/126* (2013.01); *F16M 11/18* (2013.01); *F24J 2/542* (2013.01);
(Continued)

(58) Field of Classification Search
CPC ............... F24J 2/52; F24J 2/54; F24J 2/5417; F24J 2/542; F24J 2/5424; F24J 2/5427; H02S 20/32; H02S 20/30
See application file for complete search history.

(56) References Cited

U.S. PATENT DOCUMENTS 7,968,791 B2\*  6/2011  Do .................... F24J 2/0494
126/576
8,166,709 B2  5/2012  Gonzalez Moreno
(Continued)

FOREIGN PATENT DOCUMENTS

EP  2063200 A1  5/2009
EP  2327906 A1  6/2011
WO  2005119134 A1  12/2005

OTHER PUBLICATIONS

French Preliminary Search Report for French Application No. FR260755 dated Jul. 3, 2013, 6 pages.
(Continued)

*Primary Examiner* — Eli Mekhlin
(74) *Attorney, Agent, or Firm* — TraskBritt

(57) ABSTRACT

The disclosure relates to a guide system for holding and moving sunlight-absorbing devices, in particular, solar panels or concentrated photovoltaic modules, about an azimuth axis and an elevation axis, comprising a housing, at least one azimuth drive, at least one azimuth gear unit, the azimuth drive being configured for driving the azimuth gear unit for a rotational movement about the azimuth axis, at least one elevation drive, at least one elevation gear unit, the elevation drive being configured for driving the elevation gear unit for a rotational movement about the elevation axis, and wherein the elevation gear unit is connected to a first end of a torsion tube, and the torsion tube is turnably mounted inside the housing along the elevation axis, wherein the torsion tube is supported by at least two bearings, preferably one at each end of the torsion tube, and wherein the second end of the torsion tube is configured to receive and connect to a support arm for carrying/supporting one or more of the sunlight-
(Continued)

absorbing devices, and the torsion tube further being configured to transmit torque from the elevation gear unit to the support arm.

17 Claims, 3 Drawing Sheets

(51) Int. Cl.
    *F24J 2/54*     (2006.01)
    *H02S 40/22*     (2014.01)
    *F16M 11/12*     (2006.01)
    *F16M 11/18*     (2006.01)

(52) U.S. Cl.
    CPC ........ *H02S 40/22* (2014.12); *F24J 2002/5462* (2013.01); *F24J 2002/5482* (2013.01); *Y02E 10/47* (2013.01); *Y02E 10/52* (2013.01)

(56) References Cited

U.S. PATENT DOCUMENTS

| | | | |
|---|---|---|---|
| 8,207,483 B2 | 6/2012 | Gonzalez Moreno | |
| 8,242,424 B2 | 8/2012 | Gonzalez Moreno | |
| 8,746,233 B2 | 6/2014 | Gonzalez Moreno | |
| 8,981,271 B1* | 3/2015 | Risner | F24J 2/16 250/203.4 |
| 2009/0133521 A1* | 5/2009 | Kunert | F24J 2/5417 74/22 R |
| 2010/0223865 A1 | 9/2010 | Gonzalez Moreno | |
| 2010/0263710 A1 | 10/2010 | Gonzalez Moreno | |
| 2010/0326426 A1 | 12/2010 | Gonzalez Moreno | |
| 2011/0000479 A1 | 1/2011 | Gonzalez Moreno | |
| 2011/0132433 A1* | 6/2011 | Tanaka | F16H 1/32 136/246 |
| 2011/0157733 A1* | 6/2011 | Werner | F24J 2/14 359/871 |
| 2011/0174295 A1* | 7/2011 | Clavijo Lumbreras | F24J 2/542 126/605 |
| 2011/0219759 A1* | 9/2011 | Blitz | F16M 11/08 60/327 |
| 2011/0240007 A1* | 10/2011 | Currier | F24J 2/40 126/606 |

OTHER PUBLICATIONS

International Search Report for International Application No. PCT/EP2013/079030 mailed Jan. 22, 2014, 3 pages.
International Preliminary Report on Patentability for International Application No. PCT/EP2013/079030, dated May 12, 2015, 6 pages.
International Written Opinion for International Application No. PCT/EP2013/079030, dated May 12, 2015, 5 pages.

\* cited by examiner

GUIDE SYSTEM FOR SOLAR PANELS

CROSS-REFERENCE TO RELATED APPLICATIONS

This application is a national phase entry under 35 U.S.C. §371 of International Patent Application PCT/EP2013/073030, filed Nov. 5, 2013, designating the United States of America and published in English as International Patent Publication WO 2014/072280 A1 on May 15, 2014, which claims the benefit under Article 8 of the Patent Cooperation Treaty and under 35 U.S.C. §119(e) to French Patent Application Serial No. 1260755, filed Nov. 12, 2012, the disclosure of each of which is hereby incorporated herein in its entirety by this reference.

TECHNICAL FIELD

This disclosure relates to the field of guide systems for holding and moving sunlight-absorbing devices, in particular, Concentrated Photovoltaic (CPV) modules, wherein sunlight is focused first by an optical system, for example, a lens system, before hitting a photovoltaic cell.

BACKGROUND

In order to optimize the efficiency of sunlight-absorbing devices to turn sunlight into electricity, it is important to be able to reliably and accurately track the motion of the sun across the sky with these devices, to ensure optimal reception of the sun's light.

The tracking or guide motion of a sunlight-absorbing device can be realized, for example, by moving the device around two axes, namely an azimuth axis and an elevation axis. In a standard design, movement around the elevation axis can be achieved by using two motors and gears at both ends of the guide system's housing along the elevation axis of the guide system.

Using two motors for one axis, however, not only is more expensive than, for example, just using one, but also the guide system becomes more complex and, therefore, more vulnerable to technical failure.

Alternatively, a further standard design makes use of a U-shaped element to transmit the torque exerted by a single elevation axis motor and gear at one end of the guide system's housing along the elevation axis to the other end. This design, however, is only suited to hold and move rather small and light sunlight-absorbing devices, which do not put too much torsion and load stress on the U-shaped torque transmitting element, which significantly can worsen the precision of the tracking.

In EP2063200A1, a two-axle drive system is described, wherein a single-drive motor/drive is used to hold and move a sunlight-absorbing surface around the elevation axis, wherein the surface is mounted directly to the shaft of the elevation axis drive. This design can lead to a disadvantageous distribution of load and torque within the system, in particular, for very large and heavy sunlight-absorbing surfaces or devices.

The objective technical problem to be solved can be stated as how to improve guide systems for holding and moving sunlight-absorbing devices, for example, Concentrated Photovoltaic (CPV) modules, in particular, with respect to stability, precision and efficiency.

The above-stated problem is solved by this disclosure by providing a guide system as described below.

BRIEF SUMMARY

This disclosure provides a guide system for holding and moving sunlight-absorbing devices, in particular, solar panels or Concentrated Photovoltaic modules, about an azimuth axis and an elevation axis, comprising a housing, at least one azimuth drive, at least one azimuth gear unit, the azimuth drive being configured for driving the azimuth gear unit for a rotational movement about the azimuth axis, at least one elevation drive, at least one elevation gear unit, the elevation drive being configured for driving the elevation gear unit for a rotational movement about the elevation axis, and wherein the elevation gear unit can be connected to a first end of a torsion tube.

The torsion tube can be turnably mounted inside the housing along the elevation axis, wherein the torsion tube can be supported by at least two bearings, preferably one at each end of the torsion tube, and wherein the second end of the torsion tube is configured to receive and connect to a support arm for carrying/supporting one or more of the sunlight-absorbing devices, and the torsion tube can be configured to transmit torque from the elevation gear unit to the support arm.

Here, the azimuth axis (or vertical axis) is to be understood as an axis preferentially parallel to the direction of gravity and the elevation axis (or horizontal axis) as an axis preferentially perpendicular to the azimuth axis. However, it is also possible that elevation axis and azimuth axis are not perpendicular to each other.

It is further noted that the notion of a support arm for carrying/supporting one or more of the sunlight-absorbing devices, also comprises the possibility that the support arm holds/supports a frame structure for holding one or more sunlight-absorbing devices, in particular, for example, a plurality of solar panels or Concentrated Photovoltaic modules.

A guide system according to the disclosure, can, therefore, transmit a rotational movement inside a housing via a torsion tube.

The torsion tube can be supported by bearings that are mounted to the housing. Therefore, the weight load of the support arms and sunlight-absorbing devices on the housing can be decoupled from the torque load on the torsion tube. Close to no weight load, or only a much reduced weight load, is transmitted to the torsion tube, which can yield higher precision rotational movements of the guide system as compared to the state of the art.

One of the bearings can be integrated into an elevation drive/gear unit.

In other words, the guide system has the advantage that the distribution of stress due to the load of weight of one or more sunlight-absorbing device(s) and the distribution of the load of torque can be optimized. In particular, for example, the main load of weight along the line of gravity of one or more sunlight-absorbing device(s) mounted to the device can be supported by the bearings and housing of the guide system so the load of weight can be decoupled from the elevation drive and elevation gear.

Without the need to support or hold a significant load of weight, the elevation drive and elevation gear mainly serve to rotate the sunlight-absorbing device(s) and a more stable and accurate transmission of torque from the elevation drive to the sunlight-absorbing device, even for large and heavy ones, can be achieved.

The torsion tube can be rotated by 360° and can transmit torques adaptable to any kind of drive unit. A dynamic load with torques as high as 300 kNm or even higher can be sustained. The torsion tube can also be dimensioned adequately in order to sustain any predetermined static load, for instance, caused by the weight of the solar module (from 50 kg/50 m² up to 200 kg/200 m² or higher) and/or pressures exerted on the solar modules by high wind speeds. However, the torsion tube is not limited to these physical measures and its dimensions can be adjusted in a proportional manner depending on the application.

Furthermore, with the torsion tube being inside the guide system housing and/or the lack of need for a second elevation drive and gear, the compactness of the guide system can be improved.

The housing can be preferably T-shaped, wherein the vertical bar of the "T" can, for example, house the azimuth axis and the horizontal bar of the "T" can house the elevation axis. This shape can help to achieve a better balance of the distribution of the load of weight across the guide system.

A turnable disc can be attached to the second end of the torsion tube, and the disc can be configured to receive and connect to a support arm for carrying/supporting one or more of sunlight-absorbing device(s), and wherein the torsion tube can be configured to transmit torque from the elevation gear unit to the disc.

This way, a better transfer of torque from the torsion tube to the support arm can be achieved and/or a further reduction of torsion stress on the torsion tube when torque is exerted on the torsion tube from the elevation gear unit driven by the elevation drive.

Further, a guide system can also comprise a turnable disc attached to the first end of the torsion tube and a second turnable disc can be configured to receive and connect to a second support arm for carrying/supporting one or more further sunlight-absorbing device(s) or for carrying a counterweight to balance the weight of the sunlight-absorbing device(s) attached to the second end of the torsion tube, and wherein the torsion tube can be configured to transmit torque from the elevation gear unit to the disc.

Alternatively, the second support arm for carrying/supporting one or more further sunlight-absorbing device(s) or for a carrying a counterweight may also be mounted directly to the first end of the torsion tube without a turnable disc.

In the case that, for example, one or more sunlight-absorbing devices are mounted at each end of the torsion tube of the guide system, the elevation drive and elevation gear unit can move all mounted sunlight-absorbing devices around the elevation axis by transmitting torque via the torsion tube.

The azimuth gear unit and/or the elevation gear unit can be of one of the following types or a combination thereof: a worm gear, a spur gear or a helical gear.

The worm gear can be an enveloped worm gear, i.e., wherein the contours of the worm and gear teeth can be adapted to each other in order to increase their contact surface.

The ratio between worm contours and gear teeth or the ratio between two gears and/or their sizes can depend proportionally on the surface area of the sunlight-absorbing device, wherein smaller surface areas can be driven by smaller gear ratios and/or gear sizes.

A guide system according to the disclosure can handle surface areas of up to 50 m², 100 m², 150 m², 200 m² or larger per sunlight-absorbing device and the sunlight-absorbing devices can have weights up to 50 kg, 100 kg, 150 kg, 200 kg or more.

Also, the azimuth gear unit and/or the elevation gear unit can be self-locking, which can improve the safety of operation of the guide system.

The bearings of the guide system can be sliding or roller bearings, preferentially single-row or double-row ball bearings.

In addition, axial or radial needle bearings, or tapered roller bearings or combinations of the bearings are possible.

The material of the torsion tube can comprise metal, steel or carbon, with the preferred material being, for example, steel of European structural grades S275 or S355.

The torsion tube can have, for example, an outer diameter of up to 320 mm or more, and/or a thickness of up to 12 mm or more, and/or a length of up to 1200 mm or more, and rims at both ends with a width of up to 10 mm, 20 mm or more.

As it can be the case for gear units, the dimensions of the torsion tube and/or the housing can be proportional to the surface area of the sunlight-absorbing device and/or proportional to the size of the support arm for better customization and economization of fabrication and material costs.

A solar tracking unit can then, for example, comprise a guide system as described above and one or more Concentrated Photovoltaic modules.

In a method according to the disclosure for holding and moving sunlight-absorbing devices, in particular, solar panels or Concentrated Photovoltaic modules, about an azimuth axis and an elevation axis, an elevation drive can drive an elevation gear unit for a rotational movement about the elevation axis, and a torsion tube, with a first end of the torsion tube connected to the elevation gear unit and the torsion tube turnably mounted inside the housing along the elevation axis of the system can transmit torque to a support arm for one or more of the devices, wherein the support arm is attached to a second end of the torsion tube.

BRIEF DESCRIPTION OF THE DRAWINGS

The following figures are exemplary representations of one embodiment of a guide system according to the disclosure.

DETAILED DESCRIPTION

Figure 1:
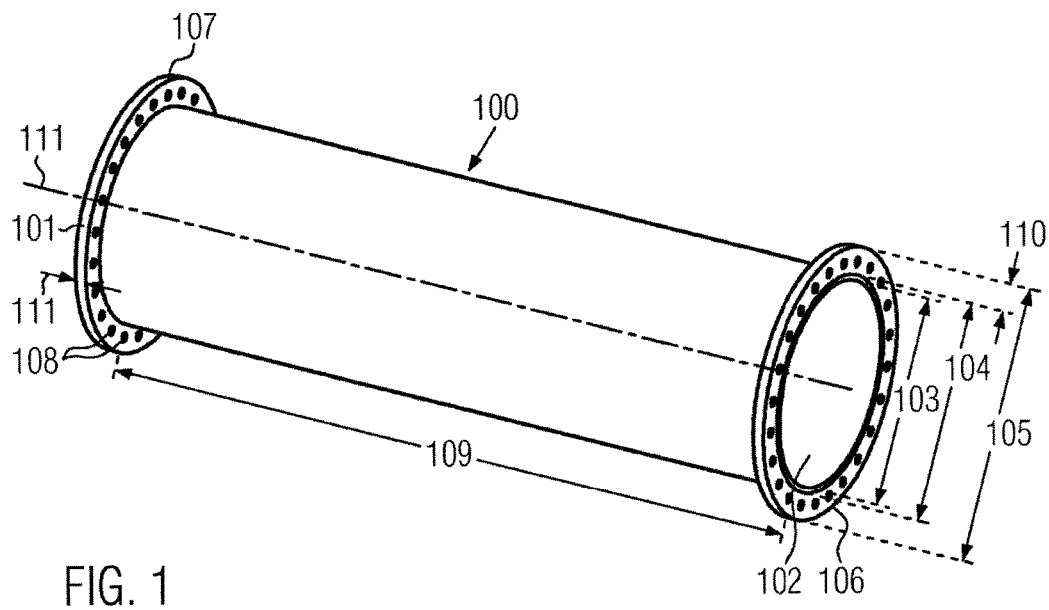
FIG. 1: A torsion tube of a guide system according to an exemplary embodiment of the disclosure.

In FIG. 1, an exemplary torsion tube 100 of a guide system according to the disclosure is shown.

The torsion tube 100 can have an outer diameter 104 of up to 320 mm or more, and/or a thickness, i.e., the difference between outer diameter 104 and inner diameter 103, of up to 12 mm or more and/or a length 109 of up to 1200 mm or more, and rims or flanges 106, 107 at both ends 101, 102 with a width 110 of up to 10 mm, 20 mm or more.

The torsion tube profile can be cylindrical, but other profiles, such as, for example, cubic profiles, are also possible.

The material of the torsion tube 100 can comprise metal, steel or carbon, with the preferred material being, for example, steel of European structural grades S275 or S355.

The rims or flanges 106, 107 can have holes 108 for attaching the torsion tube 100, for example, to a gear unit and/or a turnable disc and/or support arm by, for example, by means of screws or bolts, as shown further below in FIGS.

2A, 2B, and 3. However, other means for attaching the torsion tube 100 to further elements are possible too, for example, by welding or gluing.

It is further conceivable that a plurality of torsion tubes 100 transmits torque between an elevation drive/elevation gear unit (not shown) and one or more sunlight-absorbing devices (not shown).

The longitudinal axis 111 of the torsion tube 100 can coincide with the elevation axis of a guide system for sunlight-absorbing devices according to the disclosure.

Figure 2A:
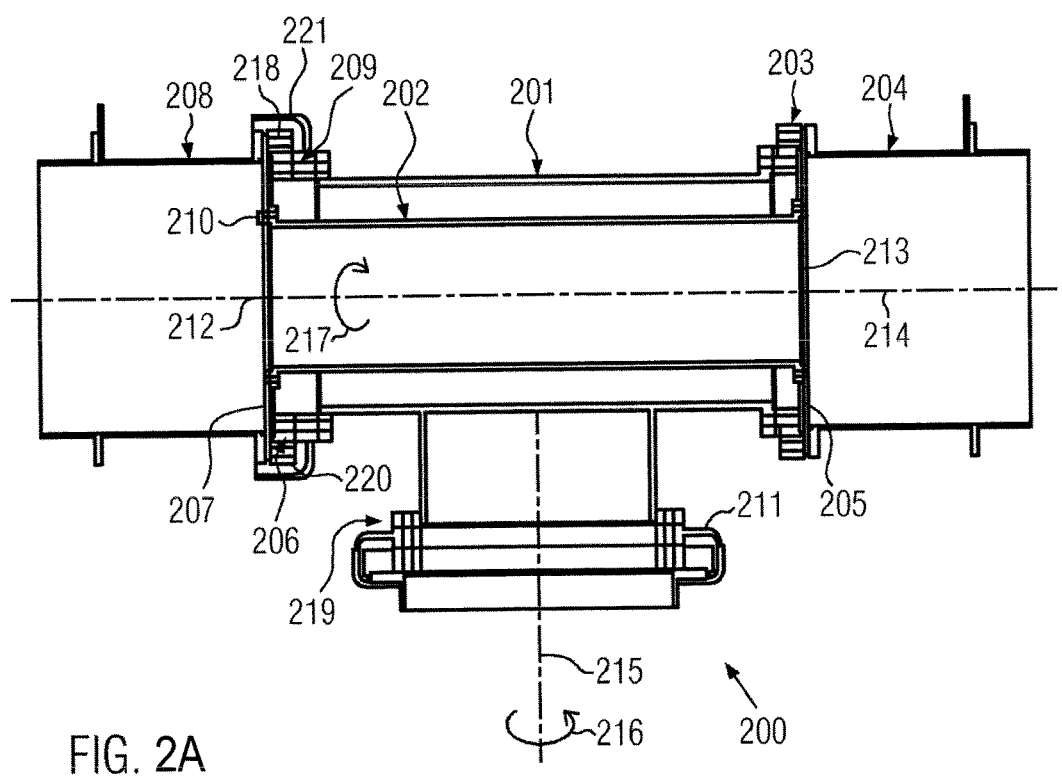
FIG. 2A: A guide system for holding and moving sunlight-absorbing devices according to an exemplary embodiment of the disclosure.
Figure 3:
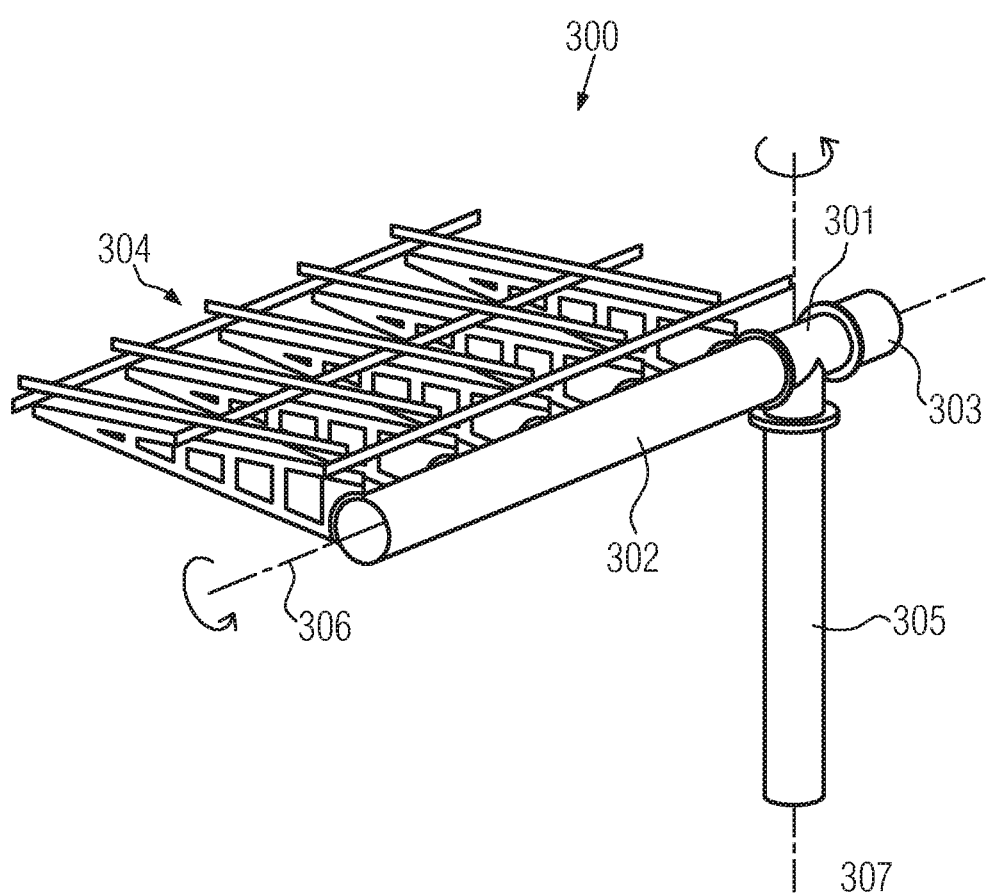
FIG. 3: A solar tracking unit according to an exemplary embodiment of the disclosure.

FIG. 2A shows an embodiment of a guide system 200 according to the disclosure for holding and moving sunlight-absorbing devices, in particular, solar panels or concentrated photovoltaic modules (see FIG. 3). The guide system 200 can move the sunlight-absorbing devices about an azimuth axis 215 with azimuthal rotation direction/rotation angle 216 and about an elevation axis 214 with elevation rotation direction/rotation angle 217.

The guide system 200 can comprise, for example, a T-shaped housing 201. The housing 201 can carry two bearings 203, 209. A torsion tube 202 can be turnably mounted at both ends 212, 213 of the housing 201 and wherein the torsion tube 202 may, for example, have any of the features described above with respect to torsion tube 100 illustrated in FIG. 1.

The housing 201 can further comprise or be connected to an elevation gear unit 206 located next to the bearing 209 supporting the first end 212 of the torsion tube 202. The elevation gear unit 206 can be attached to the first end 212 of the torsion tube 202, either directly or as shown, for example, via a turnable disc 207 mounted by screws or bolts 210 to the torsion tube 202.

The elevation gear unit 206 can be an element separate from the housing 201. Furthermore, the bearing 209 can also be a part of the elevation gear unit 206. The elevation drive (not shown) and/or elevation gear unit 206 can have a fixed immobile part 221 mounted to the housing 201 and a mobile part 218, separated by the bearing 209, and the mobile part 218 can be fixed to the turnable disc 207 and/or support arm 208.

The mobile part 218 of elevation gear unit 206 can be driven by an elevation drive (not shown), which can be, for example, mounted at a location 220 along the circumference of the elevation gear unit 206 and which, for example, can be a worm gear.

Accordingly, an azimuth gear unit 211 can be driven by an azimuth drive (not shown) that can be mounted at a location 219 along the circumference of the azimuth gear unit 211.

The second end 213 of the torsion tube 202 can also be attached to another turnable disc 205 to which a bearing 203 and/or a support arm 204 for carrying/supporting one or more of the sunlight-absorbing devices (not shown) can be mounted in order to transmit torque from the elevation gear unit 206 via the torsion tube 202 to the second end 213 and turnable disc 205 and finally to one or more of the sunlight-absorbing devices.

The use of the bearing 203 has the advantage to partition the weight load of the supporting arm 204 on the housing 201 and decoupling the weight load from the torsion tube 202. However, according to a variant, the torsion tube 202 could also be attached directly to the support arm 204.

Furthermore, the elevation gear unit 206 located next to the bearing 209 can also connect directly or via turnable disc 207 to a second support arm 208 for carrying/supporting one or more further sunlight-absorbing device(s).

As mentioned above, a guide system such as guide system 200, has several advantages. For example, the design of guide system 200 allows for an optimized distribution of stress due to the load of weight of one or more sunlight-absorbing device(s) attached to the guide system 200.

The main share of the load of weight of one or more sunlight-absorbing device(s) or the corresponding support arms 204, 208 is supported by the bearings 203, 209 and the housing 201. The elevation drive and elevation gear unit 206 are decoupled from the load of weight and thus can run more stable and precise to allow a more accurate transmission of torque from the elevation drive to the one or more sunlight-absorbing device(s). Also, only a single elevation drive is needed to rotate one or more sunlight-absorbing device(s) around an elevation axis, thereby simplifying the guide system 200, making it more robust and reducing production costs.

Figure 2B:
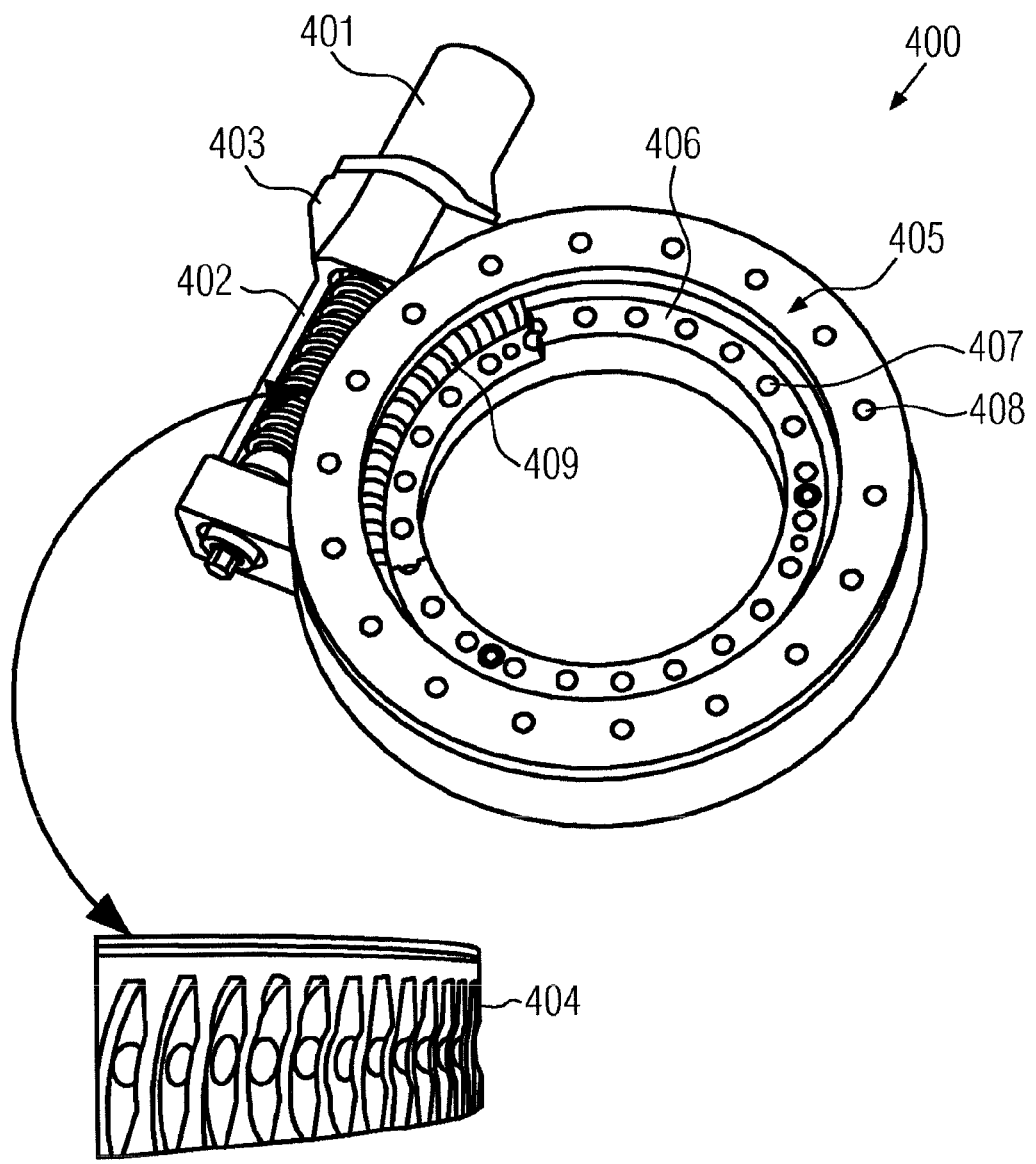
FIG. 2B: Exemplary elevation drive and elevation gear unit with integrated bearing.

FIG. 2B shows an exemplary elevation drive 400 and elevation gear unit 403 with integrated bearing 409. Therein, a motor 401 can drive worm 402 of elevation gear unit 403, which connects to gear teeth 404 in order to drive the mobile part 406 of the elevation gear unit 403, to which the bearing 409, for example, a single row ball bearing, is associated.

This ensemble of elevation drive 400 and elevation gear unit 403 can be mounted to a housing (not shown) of a guide system by means of a plate 405 having bolt holes 408.

The rotatable mobile part 406 in turn can also be mounted via bolt holes 407 to a torsion tube (not shown) and/or a turnable disc (not shown) and/or a support arm (not shown) for a sunlight-absorbing device (not shown).

FIG. 3 shows an exemplary solar tracking unit 300 comprising a guide system 301 according to the disclosure carrying on a support arm 302 a frame structure 304 for holding sunlight-absorbing devices (not shown), in particular, for example, a plurality of solar panels or concentrated photovoltaic modules, and the guide system 301 being configured for rotating the frame structure 304 around an elevation axis 306 and/or an azimuth axis 307.

A second support arm 303 connected to the guide system 301 may act as a counterweight or could also carry another frame structure (not shown) for further holding one or more sunlight-absorbing device(s).

Furthermore, the guide system 301 can be turnably mounted around the azimuth axis 307 onto a tower 305.

In a solar power plant field, a plurality of solar tracking units 300 may be deployed.

The features of the embodiments described with respect to FIGS. 1 to 3 can be combined in any way to obtain further variants according to the disclosure.

The invention claimed is:

1. A guide system for holding and moving sunlight-absorbing devices about an azimuth axis and an elevation axis, comprising:
   a housing;
   at least one azimuth drive;
   at least one azimuth gear unit, the azimuth drive being, configured for driving the azimuth gear unit for a rotational movement about the azimuth axis;
   at least one elevation drive;
   at least one elevation gear unit, the at least one elevation drive being configured for driving the elevation gear unit for a rotational movement about the elevation axis;
   a support arm for supporting one or more of the sunlight-absorbing devices; and
   a torsion tube supported by at least two bearings and having a first end connected to the elevation gear and a second end configured to receive and connect to the support arm for supporting one or more of the sunlight-absorbing devices, the torsion tube being turnably mounted inside the housing along the elevation axis, the torsion tube being configured to transmit torque from the elevation gear unit to the support arm;

wherein a circular turnable disc is attached to the second end of the torsion tube, the circular turnable disc being configured to receive and connect to the support arm for supporting one or more of the sunlight-absorbing devices, and wherein the torsion tube is configured to transmit torque from the elevation gear unit to the circular turnable disc, and wherein the torsion tube, the circular turnable disc, and the support arm are aligned with one another in an axial direction.

2. The guide system of claim 1, wherein the housing is T-shaped.

3. The guide system of claim 1, further comprising a second circular turnable disc attached to the first end of the torsion tube, the second circular turnable disc being configured to receive and connect to a second support arm for supporting one or more of the sunlight-absorbing devices.

4. The guide system of claim 3, wherein at least one of the azimuth gear unit and the elevation gear unit comprises one or more of a worm gear, a spur gear or a helical gear.

5. The guide system of claim 4, wherein at least one of the azimuth gear unit and the elevation gear unit is self-locking.

6. The guide system of claim 5, wherein the at least two bearings comprise sliding bearings or roller bearings.

7. The guide system of claim 1, wherein the torsion tube comprises metal, steel or carbon.

8. The guide system of claim 1, wherein the torsion tube has an outer diameter of up to 320 mm, a thickness of up to 12 mm, and a length of up to 1200 mm.

9. A solar tracking unit, comprising the guide system of claim 1, and one or more concentrated photovoltaic modules.

10. The guide system of claim 1, wherein the torsion tube is supported by one of the at least two bearings at the first end of the torsion tube, and by another of the at least two bearings at the second end of the torsion tube.

11. The guide system of claim 1, wherein at least one of the azimuth gear unit and the elevation gear unit comprises one or more of a worm gear, a spur gear or a helical gear.

12. The guide system of claim 1, wherein at least one of the azimuth gear unit and the elevation gear unit is self-locking.

13. The guide system of claim 1, wherein the at least two bearings comprise sliding bearings or roller bearings.

14. The guide system of claim 13, wherein the at least two bearings comprise one or more of axial needle bearings, radial needle bearings, or tapered roller bearings.

15. The guide system of claim 1, wherein the torsion tube has an outer diameter of 320 mm or more, a thickness of 12 mm or more, and a length of 1200 mm or more.

16. The guide system of claim 1, wherein the torsion tube has a rim at each of the first end and the second end of the torsion tube.

17. The guide system of claim 16, wherein each rim has a width of 10 mm or more.

* * * * *

UNITED STATES PATENT AND TRADEMARK OFFICE
CERTIFICATE OF CORRECTION

PATENT NO. : 9,531,320 B2
APPLICATION NO. : 14/441676
DATED : December 27, 2016
INVENTOR(S) : Abel Gonzalez Moreno It is certified that error appears in the above-identified patent and that said Letters Patent is hereby corrected as shown below:

In the Claims

Claim 1, Column 6, Lines 54-55, change "drive being, configured" to --drive being configured--

Signed and Sealed this
Twenty-eighth Day of November, 2017

Joseph Matal
*Performing the Functions and Duties of the
Under Secretary of Commerce for Intellectual Property and
Director of the United States Patent and Trademark Office*